(12) United States Patent
Solie et al.

(10) Patent No.: US 7,199,558 B2
(45) Date of Patent: Apr. 3, 2007

(54) AC-DC ADAPTER INTERFACE AND BATTERY CHARGER HAVING HIGH SPEED BATTERY CHARGER CURRENT FOLDBACK WHEN ADAPTER CURRENT DEMAND EXCEEDS PRESCRIBED LIMIT

(75) Inventors: Eric Magne Solie, Durham, NC (US); Michael Edwin Schneider, deceased, late of Austin, TX (US); by Susan Montgomery Schneider, legal representative, Austin, TX (US)

(73) Assignee: Intersil Americas Inc., Milpitas, CA (US)

( * ) Notice: Subject to any disclaimer, the term of this patent is extended or adjusted under 35 U.S.C. 154(b) by 366 days.

(21) Appl. No.: 10/828,376

(22) Filed: Apr. 20, 2004

(65) Prior Publication Data

US 2005/0017693 A1 Jan. 27, 2005

Related U.S. Application Data

(60) Provisional application No. 60/545,369, filed on Feb. 18, 2004, provisional application No. 60/489,135, filed on Jul. 22, 2003.

(51) Int. Cl.
*H01M 10/46* (2006.01)

(52) U.S. Cl. .................................................. 320/137
(58) Field of Classification Search ............. 320/128, 320/134, 136, 137
See application file for complete search history.

(56) References Cited

U.S. PATENT DOCUMENTS

| 6,329,796 | B1 * | 12/2001 | Popescu | 320/134 |
| 2004/0178766 | A1 * | 9/2004 | Bucur et al. | 320/112 |
| 2004/0217737 | A1 * | 11/2004 | Popescu | 320/128 |

* cited by examiner

*Primary Examiner*—Edward H. Tso
(74) *Attorney, Agent, or Firm*—Akerman Senterfitt; Neil R. Jetter

(57) ABSTRACT

Using an overcurrent detector and one-shot, an AC-DC adapter interface and battery charging circuit is operative, in response to the total current being drawn from an AC-DC adapter exceeding a prescribed limit, to immediately reduce (e.g., interrupt) the supply of battery charging current for a prescribed interval, and thereafter allow the battery charging current to incrementally adjust to an acceptable level, while maintaining the total current drawn from the AC-DC adapter to less than the prescribed limit.

14 Claims, 2 Drawing Sheets

AC-DC ADAPTER INTERFACE AND BATTERY CHARGER HAVING HIGH SPEED BATTERY CHARGER CURRENT FOLDBACK WHEN ADAPTER CURRENT DEMAND EXCEEDS PRESCRIBED LIMIT

CROSS-REFERENCE TO RELATED APPLICATION

The present application claims the benefit of co-pending U.S. Applications Ser. Nos. 60/489,135, filed Jul. 22, 2003, and 60/545,369, filed Feb. 18, 2004, by Eric M. Solie and Michael E. Schneider, respectively entitled: "High Speed Accurate Adapter Limit For Battery Charger," and "AC-DC Adapter Interface and Battery Charger Having High Speed Battery Charger Current Foldback When Adapter Current Demand Exceeds Prescribed Limit," each application being assigned to the assignee of the present application and the disclosures of which are incorporated herein.

FIELD OF THE INVENTION

The present invention relates in general to power supplies of the type used to power laptop computers and the like, and is particularly directed to an AC-DC adapter interface and battery charger circuit that is operative to rapidly interrupt the supply of battery charging current, in response to the total current being drawn by the adapter exceeding a prescribed limit, and thereafter allow the battery charging current to gradually increase to an acceptable level.

BACKGROUND OF THE INVENTION

Laptop computers derive their power from power supply units that serve a dual role, in that they feed power from a front end AC-DC converter to the core circuitry of the computer, and they also supply charging current to a computer battery that is used to power the computer when an AC source is not available. Because the current demand of the computer can vary, it is common practice to provide some form of battery charger current throttling mechanism that limits the operation of, and thereby the current being supplied by, the battery charger during high current demands of the computer. Of course a brute force way to handle the situation would be to provide a power supply that could accommodate both the peak power demand of the computer and that of the battery charger; however, doing so is expensive and therefore has not been the design of choice. Conventional charging current throttling schemes are configured to respond to one or more current monitoring locations, and are designed to gradually reduce the duty ratio of the pulse width modulator of the battery charging current supply circuitry. As such, they are slow and can allow an unwanted overcurrent condition to occur at the output of the AC-DC adapter.

SUMMARY OF THE INVENTION

Pursuant to the present invention, drawbacks of conventional computer power supply and battery charging schemes, such as those described above, are effectively obviated by a new and improved AC-DC adapter interface and battery charger that is operative, in response to the total current being drawn from the AC-DC adapter exceeding a prescribed limit, to immediately reduce (e.g., interrupt) the supply of battery charging current for a prescribed interval, and thereafter allow the battery charging current to gradually increase to an acceptable level, while maintaining the total current drawn from the AC-DC adapter to less than the prescribed limit.

Each embodiment of the adapter interface and battery charging circuit of the invention has an input port which is adapted to be coupled to the DC output of a conventional AC-DC adapter of the type that may be plugged into a standard 115 VAC, 60 Hz power outlet, and may supply an output voltage on the order of from 15–20 VDC. In addition to its input port, the interface has a pair of output ports, one of which serves as a computer system power supply port, while the other output port serves as the battery charging port. Coupled between the input port and the first output port is a current demand sense resistor, opposite ends of which are coupled to a difference amplifier, that is configured to have a prescribed gain and reference the difference voltage to ground.

The output of the difference amplifier is coupled to an overcurrent comparator and to a battery charger error amplifier. The overcurrent comparator compares the output of the difference amplifier with a reference voltage representative of a prescribed excess in adapter current (e.g., a 120% overcurrent), while the error amplifier compares the output of the difference amplifier with a voltage representative of the rated current. The output of the overcurrent comparator is used to trigger a one-shot, the output of which is coupled to the duty cycle control input of a pulse width modulator that serves as the main control element of a buck mode converter for the battery charging circuitry. The output of the error amplifier is also coupled to the duty cycle control input of the pulse width modulator.

The error amplifier drives a first relatively slow throttling loop operating in a conventional manner to gradually adjust the duty cycle of the pulse width modulator for changes in adapter current relative to that set by a current limit resistor. On the other hand, the overcurrent comparator drives a non-conventional, relatively fast charging current throttling loop, being tripped in response to a prescribed excess in adapter current flow (e.g., 120% overcurrent). This triggers the one-shot so as to disable the operation of the pulse width modulator and interrupt the flow of battery charging current.

The battery charging output port is coupled to the buck mode converter via an output current sense resistor. The voltage across the output current sense resistor is monitored by a sense amplifier, the output of which is coupled to an error amplifier. This error amplifier is referenced to a charge limit voltage and operates to adjust the duty cycle of the pulse width modulator for changes in battery charging current relative to that set by a charge limit voltage. A third, relatively slow, conventional throttling loop is used to regulate the charging of the battery based upon the intended voltage of the battery. For this purpose, the second output port is coupled through a voltage divider to a further error amplifier which is coupled to receive a voltage reference that is a prescribed fraction of the rated voltage of the battery. As a non-limiting example, for a four cell, 16.8 volt battery, the voltage reference may correspond to 4.2 volts or one-fourth of the battery voltage total.

As described above, the AC-DC adapter interface and battery charger of the present invention employs a fast response loop that is operative to rapidly interrupt the supply of battery charging current for a prescribed duration (e.g., 30 microsec.), in response to the total current being drawn by the adapter exceeding a prescribed limit (e.g., 120% overcurrent demand); it thereafter allows the other (relatively slower) analog loops to gradually increase the battery charging current from zero current to an acceptable level.

For the parametric limit of the present non-limiting example, the overcurrent monitoring circuitry is set to interrupt the operation of the battery charging circuitry in response to the adapter current exceeding 120% of its rated limit. Namely, as long as the current being drawn through the sense resistor is less than the 120% value, the overcurrent detector will not trip. Instead, respective error amplifier adjustment loops adjust the duty cycle of the pulse width modulator unit which drives the buck mode converter for appropriately charging the battery.

In response to a fast high current demand via the computer system output port, the bandwidth of the analog loop is not adequate to maintain regulation, the output of the current sense amplifier will exceed the 120% reference and cause the output of the overcurrent detector to change state. This, in turn, triggers the one-shot for a prescribed interval of time (e.g., 30 microsec.), causing the pulse width modulator that drives the buck mode converter of the battery charging circuitry to be effectively disabled for the time interval of the one-shot pulse. With the pulse width modulator disabled there is no current output from the battery charging port. After termination of the one-shot pulse, the operation of the relatively slower battery charger control loops resume at a low duty cycle, so as to gradually return the operation of the battery charger toward its previous charging functionality.

In accordance with a second embodiment of the invention, rather than interrupt the battery charger's pulse width modulator as in the first embodiment, the one-shot that is triggered by the overcurrent detector serves to slightly reduce the duty cycle of the pulse width modulator, and repeats the operation, as necessary to bring the current being drawn by the battery charging circuitry to a value that will not cause the overall current demand from the AC-DC adapter to exceed its rated value.

DETAILED DESCRIPTION

Figure 1:
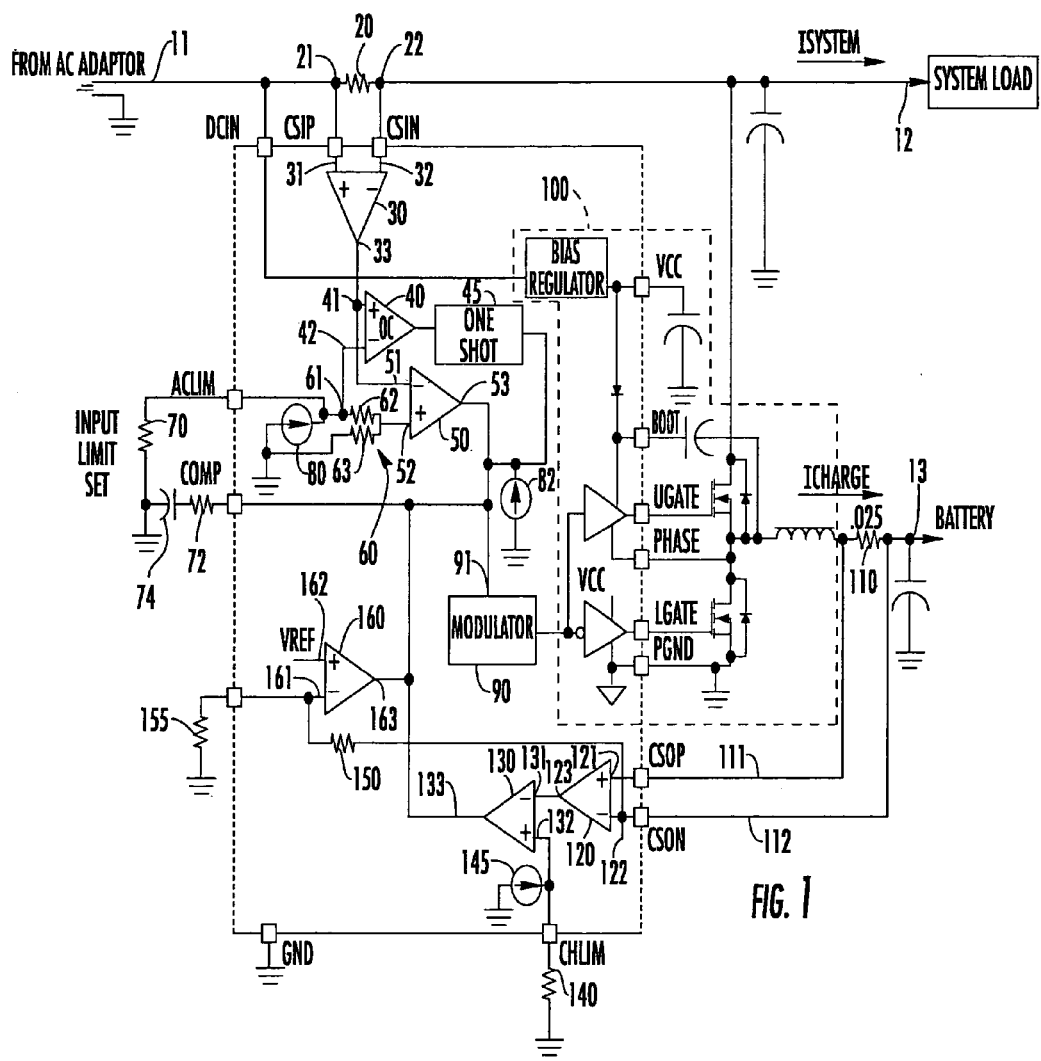
FIG. 1 diagrammatically illustrates a first embodiment of the adapter interface in accordance with the invention.

Attention is initially directed to FIG. 1, which diagrammatically illustrates a first embodiment of the adapter interface in accordance with the invention as comprising an input port 11, which is arranged to be coupled to the DC output of a conventional AC-DC adapter of the type that may be plugged into a standard 115 VAC, 60 Hz power outlet. As a non-limiting example, the AC-DC adapter to which input port 11 is coupled may provide an output voltage on the order of from 15–20 VDC. In addition to its input port 11, the interface has a pair of output ports 12 and 13. Output port 12 serves as a computer system power supply port, while output port 13 serves as the battery charging port.

Coupled between-input port 11 and output port 12 is a current demand sense resistor 20, having a first end 21 coupled via a current sense input positive pin CSIP to the non-inverting (+) input 31 of a current sense amplifier 30, and a second end 22 coupled via a current sense input negative pin CSIN to the inverting (−) input 32 of current sense amplifier 30. Current sense amplifier 30 is configured to provide a prescribed gain (e.g., a gain of 20) and reference the difference voltage to ground. Thus, for a 100 mv differential across the sense resistor 20, the output of current sense amplifier would be two volts.

Current sense amplifier 30 has its output 33 coupled to a first, non-inverting (+) input 41 of an overcurrent comparator 40 and to a first, inverting (−) input 51 of a battery charger error amplifier 50. As will be described, pursuant to the invention, overcurrent comparator 40, when tripped in response to a prescribed excess in adapter current (e.g., a 120% overcurrent) triggers a one-shot (monostable multivibrator) 45, which interrupts, for a prescribed period of time, the operation of a pulse width modulator 90 that serves as the main control element of the battery charging circuitry.

For this purpose, overcurrent comparator 40 has a second, inverting (−) input coupled to a first end 61 of a voltage divider 60, which is comprised of resistors 62 and 63 that are connected in series between an adapter current limit pin ACLIM and ground. The first end 61 of the voltage divider 60 is coupled to the pin ACLIM. The ACLIM pin is coupled to a current limit setting resistor 70 which is referenced to ground. A current source 80 is coupled to the ACLIM pin and supplies a prescribed reference current to the current limit setting resistor 70, in order to generate a predetermined reference voltage across the current limit setting resistor 70 that is representative of the target current limit of the AC-DC adapter. This reference voltage is divided by the voltage dividing resistor pair 62-63 and applied to the non-inverting (+) input 52 of battery charger error amplifier 50. Similarly, a current source 82 supplies a bias current to the series resistor-capacitor connection to the COMP pin.

The values of the resistors 62 and 63 of the voltage divider 60 are several orders of magnitude larger than the value of the resistor 70 (e.g., megohms vs. kilohms), so that most of the current supplied by the current source 80 flows through the reference resistor 70. The current flowing through reference resistor 70 sets a predetermined current limit-representative reference voltage that is applied directly to the inverting (−) input 42 of overcurrent amplifier 40 and is divided down by the voltage divider 60 for application to the (+) input 52 of amplifier 50, as described above.

The application of the divided voltage at the junction of resistors 62 and 63 to the non-inverting (+) input 52 of error amplifier 50 means that the reference voltage at the input 52 of error amplifier 50 is some (less than unity) fraction of the limit representative voltage at the ACLIM pin; conversely, it also means that the reference voltage at the input 42 of the overcurrent comparator 40 is a value in excess of unity of the voltage applied to the input 52 of the error amplifier. As a non-limiting example, the reference voltage applied to the input 42 of overcurrent comparator 40 may be set at 120% of the reference voltage applied to the input 52 of error amplifier 50. For this purpose, resistor 62 may have a resistance value of R, while resistor 63 may have a resistance value of 5R.

The output 53 of error amplifier 50 is coupled to a compensation pin COMP, which is referenced to ground through a resistor 72 and a capacitor 74. The compensation pin COMP is coupled to the duty cycle control input 91 of pulse width modulator (PWM) 90. Error amplifier 50 drives a first relatively slow analog throttling loop operating in a conventional manner to gradually adjust the duty cycle of PWM 90 for changes in adapter current relative to that set by the current limit resistor 70. On the other hand, as pointed out above, in accordance with the invention, overcurrent amplifier 40 drives a non-conventional, relatively fast charging current throttling loop, being tripped in response to a prescribed excess in adapter current flow (e.g., 120% overcurrent). This triggers a one-shot 45, which disables the operation of PWM 90, for a prescribed period of time (e.g., on the order of thirty microseconds), so as to interrupt the flow of charging current produced by a buck mode converter 100 of conventional construction, which is driven by the PWM 90, which serves as the battery charging supply.

The battery charging output port 13 of the adapter interface is coupled to the buck mode converter 100 via an output current sense resistor 110. Resistor 110 has a first end 111 coupled via a current sense output positive pin CSOP to a non-inverting (+) input 121 of a current sense amplifier 120, and a second end 112 coupled via a current sense output negative pin CSON to an inverting (−) input 122 of current sense amplifier 120. The output 123 of current sense amplifier 120 is coupled to the inverting (−) input 131 of an error amplifier 130. Current sense amplifier 120 has the function of gaining up the voltage across the sense resistor 110 by a fixed amount (e.g., 20) and level shifting it relative to ground. Current sense amplifier 120 operates in a manner similar to current sense amplifier 30. Amplifier 130 has its non-inverting (+) input 132 coupled to a receive a reference voltage determined by the value of a reference resistor 140 coupled between ground and a charge limit pin CHLIM to which a reference current source 145 is coupled. The output 133 of error amplifier 130 is coupled to the COMP pin. Error amplifier 130 operates in a manner similar to error amplifier 50, driving a second relatively slow PWM throttling loop; in particular, amplifier 130 operates to adjust the duty cycle of PWM 90 for changes in battery charging current relative to that set by resistor 140.

The interface further includes a third, relatively slow, conventional throttling loop used to regulate the charging of the battery based upon the intended voltage of the battery. For this purpose, the CSON pin (which is coupled to the output port 13) is coupled through a resistor 150 to an inverting (−) input 161 of an error amplifier 160. Input 161 is further coupled through a resistor 155 to ground, so that resistors 150 and 155 form a voltage divider for the voltage at pin CSON. The non-inverting (+) input 162 of amplifier 160 is coupled to receive a prescribed reference voltage VREF. This reference voltage corresponds to the voltage of one of a plurality of series-connected battery cells of which the battery is comprised. As a non-limiting example, for a four cell, 16.8 volt battery, reference voltage VREF may correspond to 4.2 volts or one-fourth of the battery voltage total. To step down the (16.8 v) battery voltage measured at pin CSON to the 4.2 volt value, the values of resistors 150 and 155 of the voltage divider are appropriately ratioed. In the present example, resistor 150 may have a value of 3R, while resistor 155 may have a value of R, so that input 161 of amplifier 160 receives one-fourth of the voltage at the CSON pin (which is coupled to output port 13). Like error amplifiers 50 and 130, the output 163 of error amplifier 160 is coupled to the COMP pin, and operates in the manner of these error amplifiers.

Operation

As described above, the AC-DC adapter interface and battery charger of the present invention employs a fast response loop that is operative to rapidly interrupt the supply of battery charging current for a prescribed duration (e.g., 30 microsec.), in response to the total current being drawn by the adapter exceeding a prescribed limit (e.g., 120% overcurrent demand); it thereafter allows the other (relatively slower) analog loops to gradually increase the battery charging current from zero amps to an acceptable level.

For the parametric limit of the present non-limiting example, the overcurrent monitoring circuitry is set to interrupt the operation of the battery charging circuitry in response to the adapter current exceeding 120% of its rated limit. As described above, a reference voltage representative of this 120% limit is supplied by voltage divider 60 to the inverting (−) input 42 of overcurrent detector comparator 40. As long as the current being drawn through the sense resistor 20 is less than the 120% value, overcurrent detector 40 will not trip. Instead, respective adjustment loops respectively containing error amplifier 50, error amplifier 130 and error amplifier 160 operate in the manner described above to adjust the duty cycle of PWM unit 90, which drives buck mode converter 100 for charging the battery.

In response to a high current demand however, (e.g., via the system port 12), the output 33 of amplifier 30 will exceed the 120% reference supplied by the voltage divider 60, and cause the output of overcurrent detector 40 to change state. This, in turn, triggers the one-shot 45 for a prescribed interval of time (e.g., 30 microsec.), causing the PWM 90 of the battery charging circuitry to be effectively disabled for the time interval of the one-shot pulse. With PWM 90 disabled there is no current output from port 13—the battery power supply is temporarily ineffective. After termination of the one-shot pulse, the operation of the relatively slower battery charger control loops resume, so as to gradually return the operation of the battery charger from zero current toward its previous charging functionality.

However, if the current demand of the computer port 12 remains sufficiently high as to cause the current demand to exceed the 120% reference, the output of overcurrent detector 40 will again trip the one-shot 45, so as to again interrupt the operation of the battery charging circuitry. Namely, the battery charging operation is allowed to proceed, as long as the total adapter current being drawn by the charging circuitry and the computer system is less than the prescribed threshold (120% in the present example). However, if the excessive current demand threshold is exceeded, the operation of the battery charger is immediately interrupted, so that the current needs of the computer system path via port 12 may be satisfied.

Figure 2:
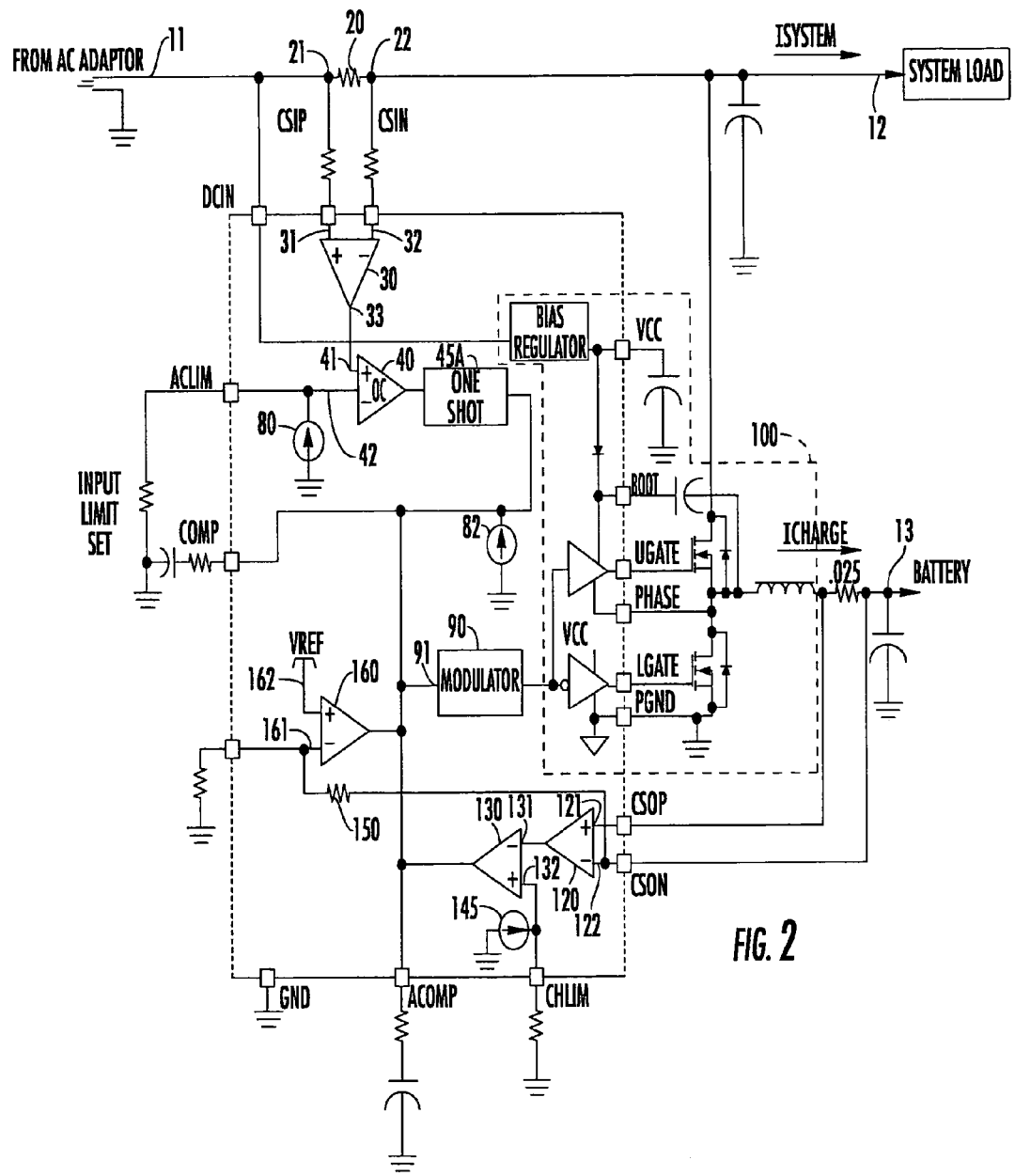
FIG. 2 diagrammatically illustrates a second embodiment of the adapter interface in accordance with the invention.

FIG. 2 diagrammatically illustrates a second embodiment of the invention, wherein, rather than interrupt the battery charger PWM as in the first embodiment of FIG. 1, the overcurrent detector 40 serves to slightly reduce the duty cycle of the PWM 90, and repeats the operation, as necessary to bring the current being drawn by the battery charging circuitry to a value that will not cause the overall current demand from the AC-DC adapter to exceed its rated value.

For this purpose, the reference voltage for the overcurrent detector 40 is derived directly from the ACLIM pin to which reference resistor 70 and current source 80 are coupled, as in the embodiment of FIG. 1. Also, the error amplifier 50 of FIG. 1 dispensed with. The output of the overcurrent detector 40 is coupled to a one-shot 45A, the output of which is coupled to the control input 91 of PWM 90. Unlike the one-shot 45 of the embodiment of FIG. 1, which produces an output pulse of sufficient width to temporarily interrupt the operation of the PWM 90, the one-shot 45A of the embodiment of FIG. 2 produces a very short output pulse (e.g, on the order of one microsecond), which is not sufficient to interrupt the operation of the PWM, but rather slightly reduces its duty cycle (e.g., by five percent). The remainder of the circuitry of FIG. 2 is essentially the same as that of FIG. 1 and operates as described with reference thereto. Rather than terminating the outputs of the error amplifiers 130 and 160 at the COMP pin, as in FIG. 1, these circuits in FIG. 2 are terminated at an auxiliary COMP pin, ACOMP, which is referenced to ground with a resistor-capacitor network, as is the COMP pin.

Operation

In response to a high current demand that exceeds the rated value as established by the voltage across reference resistor 70, the output 33 of amplifier 30 will cause the output of overcurrent detector 40 to change state. This, in turn, triggers the one-shot 45A for a very short interval (e.g., one microsec.), causing the duty cycle of the PWM 90 of the battery charging circuitry to be slightly reduced. This in turn reduces the current output of the battery charging circuitry, so as to reduce the composite current being drawn by output ports 12 and 13. If the current demand remains excessive, then the overcurrent detector will again be tripped, so as to trigger the one-shot 45A again for the relatively short interval (one microsec.), causing the duty cycle of the PWM 90 to be further reduced.

This sequence of events is repetitively carried out, until the battery charging current being produced by the battery charging circuitry has dropped to a sufficiently low value as to avoid tripping the overcurrent detector 40. If the current demand of the computer system remains high, then the value of the charging current produced by the battery charging circuitry will remain relatively low, causing a quasi trickle charging of the battery. Once the current demand of the computer system is reduced, then the PWM duty cycle reducing pulses produced by one-shot 45A will be produced less often, allowing the duty cycle of the PWM to gradually increase. The net effect of the operation of the second embodiment is to cause a gradual and repetitive ramping down and up of the duty cycle control input to the PWM, so that the charging current produce at output port 13 likewise takes on a ramping up and down (or sawtooth) waveform.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. An AC-DC adapter interface, for providing power to a utility device and a battery for powering said utility device, comprising:
    a first DC path for supplying DC power from a DC power source to said utility device;
    a second DC path coupled to said first DC path including a DC—DC converter therein for providing battery charging current for charging said battery;
    circuitry for measuring a total current flow through said first DC path supplied by said DC source, said total current including load current for said utility device and said charging current;
    said adapter interface being operative to rapidly interrupt the supply of said battery charging current, while maintaining said load current flow to said utility device, in response to said total current flow exceeding a prescribed limit, and thereafter allowing said battery charging current to gradually increase to a level that will not cause said total current flow to exceed said prescribed limit.

2. The DC power interface according so claim 1, further comprising,
    an input port that is adapted to be coupled to said DC power source;
    a first output port that is adapted to be coupled to said utility device and is coupled to said first input port by way of said first DC path;
    a second output port that is adapted to be coupled to said battery and to said second DC path;
    said battery charging circuit being operative to generate DC power for application to said second DC path and said second output port for charging said battery; and
    a control circuit including said circuitry for measuring said total current flow being operative to interrupt or reduce current drawn by said battery charging circuit in response to said total current flow exceeding a prescribed threshold.

3. The DC power interface according to claim 2, wherein said DC—DC contains a pulse width modulator controlled power generation circuit, and said control circuit is operative to interrupt the operation of said pulse width modulator, in response to said total current flow exceeding said prescribed threshold.

4. The DC power interface according to claim 3, wherein said prescribed threshold is a value in excess of one-hundred percent of a rated current drawn by said utility device.

5. The DC power interface according to claim 3, wherein said control circuit comprises a one-shot that produces an output pulse of sufficient duration to interrupt operation of said pulse width modulator.

6. The DC power interface according to claim 3, wherein said control circuit further comprises an error amplifier that is coupled to controllably adjust the duty cycle of said pulse width modulator, in response to said total current flow exceeding a reference current less than said prescribed threshold.

7. A DC power interface, comprising:
    a first DC path for supplying DC power from a DC power source to a utility device, and a second DC path for charging a battery that can be used for powering said utility device;
    an input port that is adapted to be coupled to said DC power source,
    a current sensor in series with said input port for measuring a total current flow through said first DC path supplied by said DC source, said total current including load current for said utility device and charging current for said battery;
    a first output port that is adapted to be coupled to said utility device and is coupled to said input port by way of said first DC path;
    a second output port that is adapted to be coupled to said battery and to said second DC path;
    a battery charging circuit comprising a DC—DC converter including a pulse width modulator, said modulator having at least one control input, said battery charging circuit coupled to said first DC path and being operative to generate said charging current into said second output port for charging said battery; and
    a control circuit including a sense amplifier for monitoring said total current flow and generating a measured voltage at its output relating to said total current flow, and structure for generating a current limit representative voltage, and
    at least one response loop for receiving said measured voltage and said current limit representative voltage, an output of said response loop coupled to said control input, wherein an amount of said battery charging current supplied by said battery charging circuit is reduced in response to said total current flow exceeding a prescribed threshold current limit.

8. The DC power interface according to claim 7, wherein said response loop comprises an overcurrent comparator, an output of said overcurrent comparator coupled to a one-shot, said one shot coupled to said control input, wherein said one shot produces an output pulse that causes a reduction in the duty cycle of said pulse width modulator, in response to said total current flow exceeding said prescribed threshold.

9. A method of operating a DC power interface having:
- a first DC path for supplying DC power from a DC power source to a utility device;
- a second DC path for charging a battery that can be used for powering said utility device;
- an input port that is adapted to be coupled to said DC power source;
- a first output port that is adapted to be coupled to said utility device and is coupled to said first input port by way of said first DC path;
- a second output port that is adapted to be coupled to said battery and to said second DC path; and
- a battery charging circuit comprising a DC—DC converter including a pulse width modulator, said modulator having a control input, said battery charging circuit coupled to said first DC path and being operative to generate DC power for application to said second DC path and said second output port for charging said battery;

said method comprising the steps of:
- (a) monitoring total current flow through said first DC path supplied by said DC source, said total current including load current for said utility device and charging current for said battery; and
- (b) controllably reducing the effective operation of said battery charging circuit to reduce said charging current in response to said total current as monitored in step (a) exceeding a prescribed threshold.

10. The method according to claim 9, wherein said battery charging circuit contains a pulse width modulator controlled power generation circuit, and step (b) comprises selectively interrupting the operation of said pulse width modulator, in response to current flow through said first DC path exceeding said prescribed threshold, and thereafter allowing said pulse width modulator to gradually resume control of operation of said power generation circuit.

11. The method according to claim 9, wherein said battery charging circuit contains a pulse width modulator controlled power generation circuit, and step (b) comprises controllably and repetitively reducing the duty cycle of said pulse width modulator, as necessary, in response to current flow through said first DC path exceeding said prescribed threshold, to reduce current flow through said first DC path to no more than said prescribed threshold.

12. The method according to claim 9, wherein said prescribed threshold is a value in excess of one-hundred percent of a rated current drawn by said utility device.

13. The DC power interface according to claim 7, wherein said at least one response loop comprises a first and a second loop having different response times.

14. The DC power interface according to claim 13, wherein said first loop is a faster loop as compared to said second loop, said first loop comprising:
- an overcurrent comparator, an output of said overcurrent comparator coupled to a one-shot, said one shot coupled to said control input, wherein said one shot produces an output pulse that causes a reduction in the duty cycle of said pulse width modulator, in response to said total current flow exceeding said prescribed threshold, and
- a second response loop, said second response loop be a slower loop comprising an error amplifier driving said control input of said modulator.

* * * * *

UNITED STATES PATENT AND TRADEMARK OFFICE
CERTIFICATE OF CORRECTION

| | | |
|---|---|---|
| PATENT NO. | : 7,199,558 B2 | Page 1 of 1 |
| APPLICATION NO. | : 10/828376 | |
| DATED | : April 3, 2007 | |
| INVENTOR(S) | : Eric Magne Solie et al. | |

It is certified that error appears in the above-identified patent and that said Letters Patent is hereby corrected as shown below:

In the claims:

Claim 2, column 7, line 61, replace "so" with --to--.
Claim 3, column 8, line 12, after "DC-DC" add --converter--.

Signed and Sealed this

Fifteenth Day of May, 2007

JON W. DUDAS
*Director of the United States Patent and Trademark Office*